United States Patent Office 2,771,764
Patented Nov. 27, 1956

2,771,764
ART OF PRODUCING CANDLES WITH COLORED FLAMES

Wilbur C. Moorman, Indianapolis, and Joseph C. Muhler, Bloomington, Ind.

No Drawing. Application December 2, 1953, Serial No. 395,856

2 Claims. (Cl. 67—22)

The present invention concerns improvements (a) in the art of producing candles that emanate illumination of different colors when burning as well as improvements in (b) candles themselves as an article of manufacture and (c) the compounds from which they are made.

Insofar as is known all of the products of this nature at present produced or patented are unsatisfactory for one or more of tthe following reasons:

1. The color produced as illumination is not sufficiently saturated. In some case the colors are quite pale and ineffective.
2. The materials used frequently result in spattering while burning.
3. Incomplete combustion resulting from too great a temperature differential or gradient in tthe mixture between the color producing compound, body and wick of a burning candle.
4. Excessive smoking resulting from the characteristics of the materials employed and their effect upon the hydrocarbon compounds constituting the body of the candle.
5. Many materials employed are sufficiently toxic or produce toxic by-products such that they must be used in the open air to prevent poisoning.

All of the presently known methods used to produce candles that burn with the illumination of different colors comprise physical mixtures in which the color producing agent is suspended or mixed throughout the mass of compatible material forming the body of the candle and the wick. The result is a smoothly burning material candle containing discrete particles of foreign matter coloring agent of widely different characteristics.

It is an object of this invention to produce a candle capable of emanating a highly saturated colored light without spattering, smoking toxic effects of any kind and with substantially complete oxidation of all its components.

It is an object of the invention to compound a homogeneous compatible substance or product composed of the color producing elements and the hydrocarbon constituents of the candle body capable of being liquified and entrained by the wick. The resultant composition of matter is a chemical compound in which the inorganic coloring elements form part of the organic molecule of the body and of the resulting liquid drawn up by the wick and burned.

It is an object of the invention to produce a candle from compatible material having a structural formula of such a nature that one or more hydrogen atoms have been replaced by a metal or metallic color producing salt.

It is an object of the invention to produce a candle from a compound comprising hydrogen, carbon, oxygen and nitrogen forming a homogeneous compatible substance or product composed of the color producing element or elements and the constituents of the candle and the wick placed together in a compound formation in which the inorganic coloring agents or elements are constituents of the compatible organic molecules.

It is an object of the invention to produce a candle with heat transferring compound as a part thereof to permit the color producing constituents of the body of the candle to be more intimately associated with the wick so that a more evenly burning product is obtained.

As an example, one can make a red flame producing candle by forming a mixture with strontium perchlorate homogeneously distributed throughout the candle and the wick, but not part of it. That is, one would find discrete particles or groups of strontium perchlorate molecules scattered throughout the mass. Such a candle would be open to objections numbered 1, 2 and 3 and in some degree 4, listed above. According to the present invention the coloring agent is incorporated in the combustible material of the candle as a chemical combination or compound. As shown below, a molecule of suitable candle forming material is employed in which one of the hydrogen atoms is replaced by the color producing metal or its salt. A suitable candle forming molecule which will produce such a compound is referred to herein as a compatible molecule.

In practicing the invention the following examples are presented as illustrative and representative and are not to be taken as limiting.

I. A candle which burns with a good red color and avoids the objections listed may be made by combining one part of lithium nitro acetate and three parts of glycerol. Two parts of this product are then combined with four parts of sorbitol. The end product is a compound which may be mixed with a good grade of candle wax. Strontium formate can be substituted for the lithium nitro acetate. Salts of lithium, and strontium may be used to produce a red color.

In general a representative structural formula of the compatible molecule is as follows:

$$O=N-\underset{\underset{H}{|}}{\overset{\overset{H}{|}}{C}}-\overset{\overset{O}{\|}}{C}-O-Li$$

II. Salts of barium may be used to produce a green color as follows:

Barium nitroacetate
Barium acetyl acetonate
Barium alkyl amide

A representative structural formula of a compatible molecule containing a barium salt is as follows:

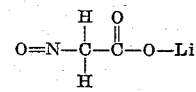

III. Salts of calcium and selenium may be used to produce a blue color as follows:

Calcium nitroacetate
Calcium acetyl acetonate
Calcium alkyl amide

Representative structural formulae of compatible molecules containing a calcium salt and a selenium salt, respectively, are as follows:

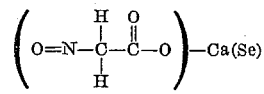

IV. Salts of aluminum and magnesium may be used to produce a white color as follows:

Aluminum nitroacetate
Aluminum acetonate

Aluminum alkyl amide
Magnesium nitroacetate
Magnesium acetonate
Magnesium alkyl amide Representative structural formulae of compatible molecules containing aluminum and magnesium are as follows:

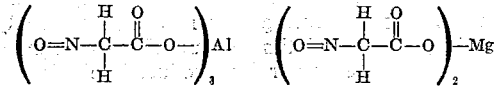

V. Salts of sodium may be used to produce a yellow color as follows:

Sodium nitroacetate
Sodium acetonate
Sodium alkyl amide

A representative structural formula of compatible sodium containing molecule is

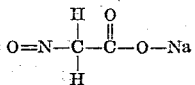

VI. Salts of potassium may be used to produce a violet color.

Potassium nitroacetate
Potassium acetyl acetonate
Potassium alkyl amide

A representative structural formula of compatible potassium containing molecule is

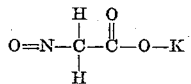

The above examples have been the most satisfactory through tests. However, we do not limit ourselves to the use of any particular chemical, but seek in the appended claims to cover the concept of the use in a candle or the like, of a coloring agent combined in a homogeneous compound compatible with the hydrocarbon matrix or a hydrocarbon having the coloring agent chemically combined in its molecule, whether the said hydrocarbon is one of several comprising the matrix or is the only hydrocarbon in the candle.

As a class, the alkyl amides are very satisfactory, and substitution of one hydrogen atom by various different inorganic elements lends itself to the production of various different color flames. Representative structural formulae are as follows:

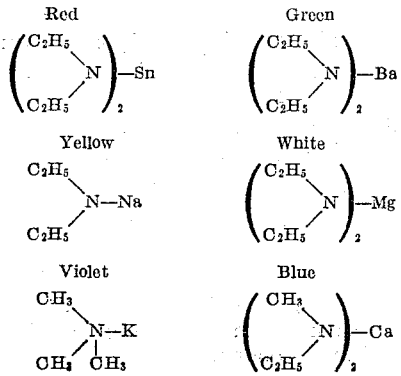

The acetyl acetonates are also very useful and substitution of various metals, inorganic salts or radicals for one of the hydrogens in the hydroxyl group adjacent a double valence bond produce good colored flames. Representative structural formulae are symbolized as follows:

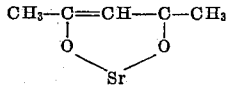

Another and important improvement in the art of making candles with colored flames is the incorporation of heat transferring compounds which cause the color producing compounds of the candles to become more intimately associated with the wick so that a more evenly burning product is obtained. As noted above spattering and incomplete combustion due to temperature differential are faults in present day colored flame candles. The addition of the color producing compounds in most cases increase the kindling temperature of the candle material sufficiently to limit the effective combustion of the produce. This effect is reduced or eliminated by the inclusion of such materials as the biphenyls or diphenyls in the product. As a specific example, diphenyl ether may be used.

While there has been described above what are at present believed to be the preferred forms of this invention, it will be understood that various changes may be made therein by those skilled in the art without departing from the spirit of the invention. All such variations which fall within the true spirit of the invention are intended to be included in the appended claims in which generic terms have been employed to include all such variations and equivalent structures.

We claim:

1. A candle for emanating colored light of high saturation comprising a mass of smoothly burning compatible molecules having the following general structural formula:

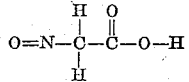

in which one of the hydrogen atoms is replaced by a selected metal to provide a chemical compound for producing light of a predetermined color, a wick for said candle having intimate association with the mass of material whereby said color producing metal is a constituent of the molecule itself and is distributed evenly through the mass and through the liquid produced by the melting thereof and is introduced to the wick by capillary action as an integral part of the melted combustible material.

2. The combination set forth in claim 1, in which the metal employed to replace one of the hydrogen atoms in said molecule is one of a group consisting of the following metals and their salts: Li, Ba, Ca, Al, Mg, Na, K and Sr.

References Cited in the file of this patent

UNITED STATES PATENTS

| | | |
|---|---|---|
| 2,184,666 | Fredericks | Dec. 26, 1939 |
| 2,551,574 | Fredericks | May 9, 1951 |